Dec. 15, 1959   J. G. CADILLAC ET AL   2,917,165
VEHICLE CAB BOX
Filed Nov. 6, 1958
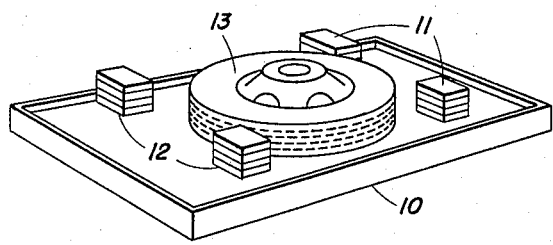
Fig. 1.
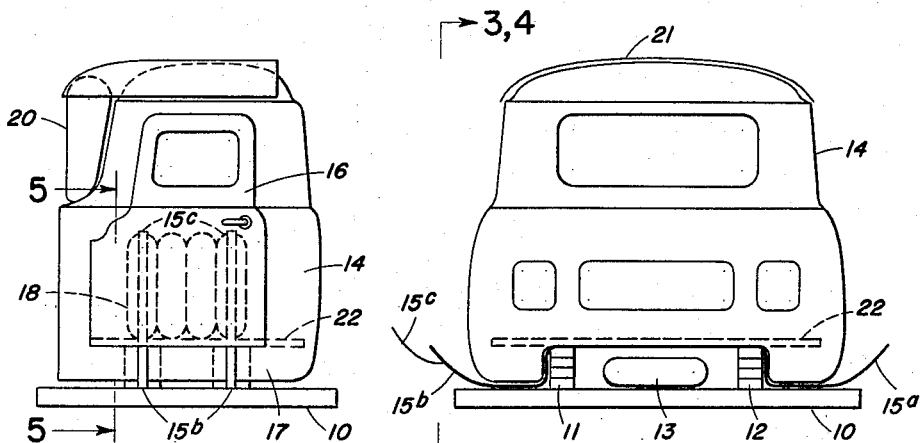
Fig. 4.   Fig. 2.
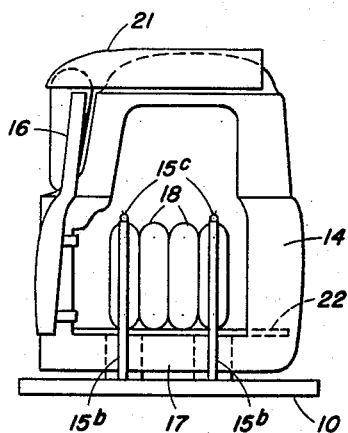   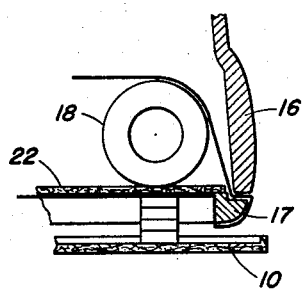
Fig. 3.   Fig. 5.
INVENTORS
John G. Cadillac
Robert T. Cadillac
BY William F. Fox
ATTORNEY United States Patent Office 2,917,165
Patented Dec. 15, 1959

2,917,165
VEHICLE CAB BOX

John George Cadillac, Jersey City, N.J., and
Robert T. Cadillac, Brooklyn, N.Y.

Application November 6, 1958, Serial No. 772,269

2 Claims. (Cl. 206—47)

This invention relates to the reduction of shipping cost of boxed vehicles and specifically relates to a box for vehicle cabs containing other parts of a vehicle such as tires, seats, fenders, etc.

In the boxing of vehicles, such as trucks, buses or automobiles, in one type of box, the vehicle is disassembled into major subassemblies, one of which is the cab, and each major subassembly is packaged separately. This invention relates specifically to the boxing of the cab subassembly.

In previous techniques, the cab was removed and packaged separately, with no use being made of its interior because the cab itself when removed from the vehicle was a rather light, weak unit and it was difficult to utilize this unit as a storage container without damaging it.

This invention therefore has as its principal object the packaging of the interior of a vehicle cab so as to utilize its inner portion for reduction of shipping costs. It has, as a further object, the strengthening of the cab to use for storage. These and other objects will be developed as this specification proceeds.

In summary, this invention proposes to utilize the interior of a cab or vehicle for storage by maintaining a second floor inside the vehicle supported by external supports and thereby having the weight of the contents of the cab impressed directly on the external supports. As an additional and important feature, this invention provides the means to tie down or strap the contents to the cab and to the base of the box, by utilizing certain structural arrangements in the cab itself for strength.

A cab or body is normally mounted on a vehicle chassis by several major mounting points through which bolts are passed to connect it to the chassis. In the boxing of such cabs, a flat wooden platform is first made to a size slightly larger than one or two cabs. On this platform there are placed four built-up wooden block arrangements of sufficient height so that when they contact the under portion of the cab which rests on them, they will maintain the cab in a level position and clear of the inside of the case bottom. The blocks are so placed on the platform that the cab's weight bears on the blocks in the same manner as the cab would bear on the mounting points of the chassis. Between the support blocks there is normally a sufficient space to mount one of the vehicle's wheels with its tire. The cab is placed on the platform with its blocks. Inside the cab there is then erected a false floor so arranged as to take its bearing on the four points of the cab which are resting on the four supporting blocks. In this manner, many units to be placed inside the cab bear on this false floor and through the floor to the supporting blocks and none of their weight is taken on the relatively thin sheet-metal floor of the cab body.

This false floor can either take the form of a specifically fabricated flooring with four supporting points, or it could take the form of a sheet of ply wood of sufficient strength to withstand the weight. The exact form of the false flooring will be determined by the configuration of the particular cab in question.

A problem is presented, however, in attempting to hold rigidly in position, the contents to be placed on this internal false floor. To solve this problem, applicants utilize certain structural features of the cab itself to hold the contents. It should be borne in mind in this respect that the contents might comprise a number of large tires and other heavy parts, the aggregate weight of which often will be many times the weight of the cab itself.

To permit strapping the heavy material into the cab, this invention proposes that a length or lengths of steel or wire strapping be placed along the top of the platform and by securing to the platform, either by nailing to it, by passing under the wheel, which is secured to the platform or passing under the blocks on the platform. This strap or straps is then passed around the lower frame of the cab with the door open, and is then passed around and tightened on the contents of the cab. Normally, the light metal lower frame would be easily bent in transit, due to the strain placed on it by the weight of the cab's contents. However, this invention proposes that having applied the strap in the manner prescribed, then the door of the cab may be closed on the strap. This will provide a rigid member to take the strain on the strap and prevent buckling of the lower portion of the cab. The cross-section of the lower portion of the door is of sufficient strength and is a sufficiently snug fit against the lower portion of the cab to strengthen it.

What we have then is a system in which the strap passes around a weak member but has closed on it a strong member to support the weak member.

It has been found out these two features in conjunction with each other, namely, a direct transferal of the weight of the contents through to the floor of the box and then utilization of the door of the cab as a strengthening member in the special manner described that the cab can be used for transporting heavy articles without damage.

This invention may be best described by reference to the accompanying drawings in which:

Figure 1 is an isomeric view of the platform showing mounting blocks in place.

Figure 2 is a rear elevation of a cab mounted on the blocks.

Figure 3 is a section through 3—3 of Figure 2 and shows the straps in place.

Figure 4 is a section through 4—4 of Figure 2 and shows the door closed on the straps.

Figure 5 is a section through 5—5 of Figure 4.

Referring to the figures in more detail, the platform 10 is made of plywood or wood planks as is common in the art of packing or boxing. Mounted on the platform 10 are built-up supports or blocks 11 and 12 of sufficient height to hold the cab level and so located as to fall in position below the securing points of the cab to the chassis. A tire and wheel 15 may normally be conveniently positioned between the blocks. The cab 14 is mounted on the blocks 11 and 12 and running beneath the cab is a wire strap (or straps) 15a, 15b and 15c. The portion 15b is passed around the lower portion 17 of the cab which portion is normally not strong enough to withstand much pressure.

Because the cab is of such light metal construction, there is placed inside the cab a reinforcement 22 which may be a special shape or may be a flat piece so designed as to take its bearing on the four contact points of the supports 11 and 12. Thus the weight of the contents will bear on the case floor and not on the cab floor.

The space around the outside of the cab may be used to contain other pieces, such as seat 16 which is nested against the windshield or hood 21 which is on top of the cab.

In Figure 3, the straps 15c secure the load 18 in place. To strengthen the lower member, the cab door 16 is closed on the strap (Figure 5) and any upward thrust is thus taken by the door, which is sufficiently strong to withstand it. We thus have a cab and contents arrangement in which the cab is protected from damage and yet is fully packed internally. The remainder of the shipping box is built up in the usual way to enclose the cab.

As this invention may be embodied in several forms without departing from the spirit or essential characteristics thereof, the embodiments described in the foregoing specification are therefore illustrative and not restrictive, since the scope of the invention is defined by the appended claims rather than by the description preceding them, and all changes that fall within the metes and bounds of the claims, or of forms that are functional as well as conjointly co-operative equivalents, are therefore intended to be embraced by these claims.

We claim:

1. A vehicle cab and box for shipping which comprises a platform forming the bottom of the box, a plurality of supports arranged on the platform, a vehicle cab mounted thereon, the supports of sufficient height so that the cab mounted thereon is level, the supports arranged under the cab in the same positions as the points on the cab where it is normally connected to a chassis frame, contents comprising vehicle parts arranged in the cab, a strap passing under the cab between the bottom of the cab and the platform, the strap passed into the cab through the door openings at the bottom thereof between the bottom of the closed doors of the cab and the door frames, the strap connected to itself to form a firm holding means for the cab contents.

2. A vehicle cab and box for shipping which comprises a platform forming the bottom of the box, a plurality of supports arranged on the platform, a vehicle cab mounted thereon, the supports of sufficient height so that the cab mounted thereon is level, the supports arranged under the cab in the same positions as the points on the cab where it is normally connected to the chassis frame, a reinforced false floor in the cab bearing directly on the plurality of supports, contents comprising vehicle parts arranged in the cab on the reinforced false floor, a strap passing under the cab between the bottom of the cab and the platform, the strap passed into the cab through the door openings at the bottom thereof between the bottom of the closed doors of the cab and the door frames, the strap connected to itself to form a firm holding means for the cab contents.

No references cited.